United States Patent
Wheeler, Jr.

(10) Patent No.: US 6,852,181 B2
(45) Date of Patent: Feb. 8, 2005

(54) FLATTENED U-BOLT AND METHOD

(75) Inventor: Robert P. Wheeler, Jr., Dayton, OH (US)

(73) Assignee: Consolidated Metal Products, Inc., Cincinnati, OH (US)

( * ) Notice: Subject to any disclaimer, the term of this patent is extended or adjusted under 35 U.S.C. 154(b) by 91 days.

(21) Appl. No.: 10/277,392

(22) Filed: Oct. 22, 2002

(65) Prior Publication Data

US 2003/0111143 A1 Jun. 19, 2003

Related U.S. Application Data

(60) Provisional application No. 60/336,523, filed on Oct. 23, 2001.

(51) Int. Cl.$^7$ .................................................. C21D 8/06
(52) U.S. Cl. ........................ 148/599; 148/650; 72/700; 470/13
(58) Field of Search ................................. 148/320, 650, 148/599; 72/700, 364; 470/13

(56) References Cited

U.S. PATENT DOCUMENTS

| | | |
|---|---|---|
| 1,862,281 A | 6/1932 | Schaefer |
| 1,900,049 A * | 3/1933 | Ellison ........................ 411/389 |
| 2,767,836 A | 10/1956 | Nachtman et al. |
| 2,767,837 A | 10/1956 | Nachtman et al. |
| 2,880,855 A | 4/1959 | Nachtman |
| 2,933,424 A | 4/1960 | Canney et al. |
| 2,953,794 A | 9/1960 | Klooz |
| 3,001,897 A | 9/1961 | Nachtman |
| 3,066,408 A | 12/1962 | Fader |
| 3,076,361 A | 2/1963 | Epstein et al. |
| 3,230,118 A | 1/1966 | Tufts |
| 3,488,231 A | 1/1970 | Zackay et al. |
| 3,488,986 A | 1/1970 | Stammbach |
| 3,557,587 A | 1/1971 | Cardillo |

(List continued on next page.)

FOREIGN PATENT DOCUMENTS

| | | |
|---|---|---|
| GB | 1535775 | 12/1978 |
| JP | 51144328 | 1/1981 |
| JP | 58027958 | 2/1983 |
| WO | WO 9315233 | 8/1933 |

OTHER PUBLICATIONS

PCT/US 02/33893, *International Search Report*, Feb. 14, 2003.

(List continued on next page.)

*Primary Examiner*—Deborah Yee
(74) *Attorney, Agent, or Firm*—Wood, Herron & Evans, LLP

(57) ABSTRACT

A method for cold forming a flattened, end-threaded rod into a U-bolt answers the need for high-strength steel rods that can be bent into flattened U-bolts by spring and suspension repair facilities or the like. By controlling the amount of work put into the end-threaded flattened rod during bending, it is possible to manufacture a flattened, end-threaded rod from a high-strength steel that can be successfully cold bent into a U-bolt. The amount or degree of flattening and the radius of the U-bolt are variables which applicant controls to successfully cold bend a high-strength steel flattened rod into a U-bolt. Therefore, the spring and suspension repair facility avoids the need to heat the flattened rods for warm forming and, instead, can maintain an inventory of end-threaded and flattened rods for cold forming into flattened U-bolt comply with OEM designs when modifying or repairing vehicles.

12 Claims, 3 Drawing Sheets

U.S. PATENT DOCUMENTS

| | | | |
|---|---|---|---|
| 3,573,999 A | 4/1971 | Gokyu |
| 3,668,020 A | 6/1972 | Lucht |
| 3,720,087 A | 3/1973 | Gottschlich |
| 3,877,281 A | 4/1975 | Shimizu et al. |
| 3,883,371 A | 5/1975 | Geary |
| 3,904,445 A | 9/1975 | Gallagher, Jr. |
| 3,908,431 A | 9/1975 | Jones et al. |
| 3,959,999 A | 6/1976 | Filatov et al. |
| 4,289,548 A | 9/1981 | Bucher et al. |
| 4,312,210 A | 1/1982 | Nishizawa et al. |
| 4,317,355 A | 3/1982 | Hatsuno et al. |
| 4,365,824 A | 12/1982 | Ohno et al. |
| 4,378,687 A | 4/1983 | Shilov et al. |
| 4,393,679 A | 7/1983 | Kusaba |
| 4,608,851 A | 9/1986 | Khare |
| 4,685,319 A | 8/1987 | Aoyagi et al. |
| 4,779,439 A | 10/1988 | Baldi |
| 4,805,437 A | 2/1989 | Heil, Jr. et al. |
| 4,958,508 A | 9/1990 | Lin |
| 4,966,026 A | 10/1990 | Nishino |
| 4,982,591 A | 1/1991 | McGahhey |
| 5,094,698 A | 3/1992 | Gallagher, Jr. |
| 5,121,622 A | 6/1992 | Kosak et al. |
| 5,203,193 A | 4/1993 | Iguchi et al. |
| 5,236,520 A | 8/1993 | Gallagher, Jr. |
| 5,287,715 A | 2/1994 | Kusaba |
| 5,330,594 A | 7/1994 | Gallagher, Jr. |
| 5,392,624 A | 2/1995 | Properzi |
| 5,453,139 A | 9/1995 | Gallagher, Jr. |
| 5,454,888 A | 10/1995 | Gallagher, Jr. |
| 5,496,425 A | 3/1996 | Gallagher, Jr. |
| 5,538,566 A | 7/1996 | Gallagher, Jr. |
| 5,704,998 A | 1/1998 | Gallagher, Jr. |
| 6,325,874 B1 * | 12/2001 | Wheeler, Jr. ............... 148/650 |

OTHER PUBLICATIONS

C.W. Wegst, *Stahlschlussel*, 15th Edition, 1989.

C.I. Garcia, A.K. Lis and A.J. DeAdo, *A New Cost–Effective Steel for High Strength Cold Forming Operations*, 1988.

C.I. Garcia, A.K. Lis and A.J. DeArdo, *A New Microalloyed Multi–phase Steel for High Strength Cold Heading Applications*, Proceedings of the 60th Annual Convention and 1990 Division Meetings of the Wire Association International Inc., pp. 26–30.

Saarstahl, *Wire and Wire Rods Hardened and Tempered in Coils*, Brochure, Apr. 1981.

A.J. DeArdo, *Accelerated Cooling: A Physical Metallurgy Perspective*, Canadian Metallurgical Quarterly, vol. 27, No. 2, pp. 141–154, 1988.

R.G. Davies, *The Deformation Behavior of a Vanadium–Strengthened Dual Phase Steel*, Metallurgical Transactions, vol. 9A, pp. 41–52, Jan. 1978.

Isao Gokyu and Teruo Kishi, *Warm Working of Steel*, Japanese Inst. of Metal vol. 9, Supp. 1968.

M.L. Bernshtein and N.V. Filatova, *Strengthening of Warm–Rolled Low–Carbon Steels*, 2354 Metal Science and Heat Treatment 26, pp. 128–131, Feb. 1984.

Carl A. Keyser, *Materials Science in Engineering, Second Edition*, pp. 236–237, 1974, 2nd Edition.

Kobe Steel, *High–Tensile Bolts*, Chemical Abstracts No. 101411b, vol. 95 (Sep. 1981) No. 12, p. 219.

E. Nehl, *Warm Extrusion of Free–Cutting Steels*, CA 102(22): 888 63K American Chem Society, 604–8, 1984.

W.T. Lankford, *Making, Shaping and Treating of Steel*, 1985.

* cited by examiner

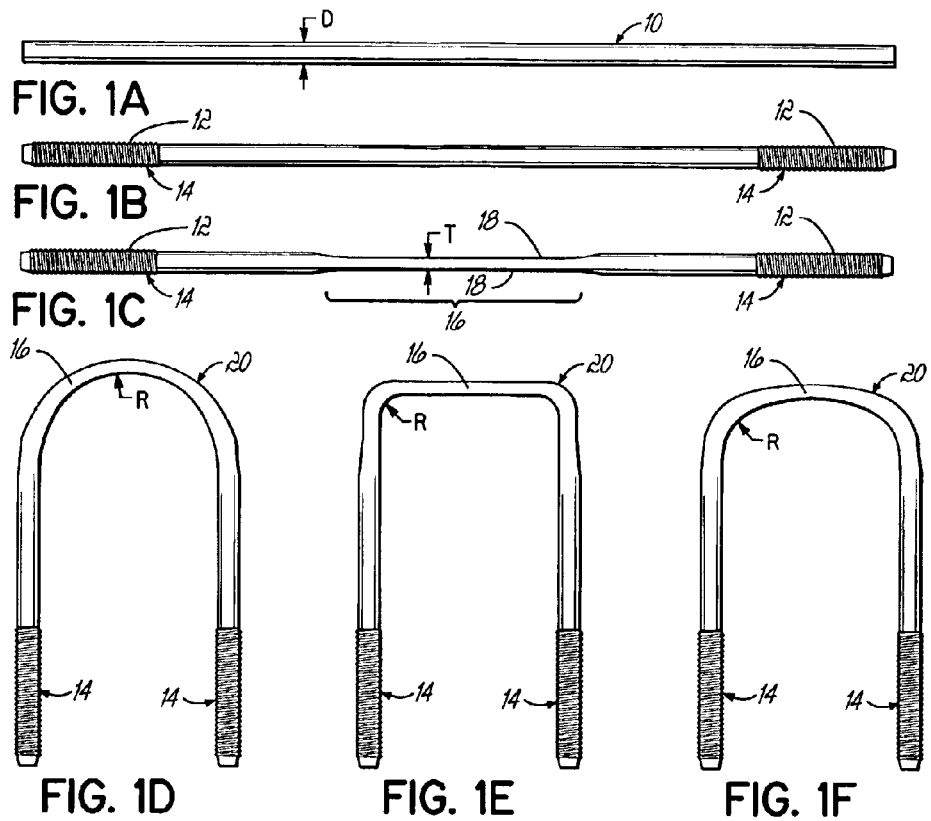
FIG. 1A  FIG. 1B  FIG. 1C  FIG. 1D  FIG. 1E  FIG. 1F
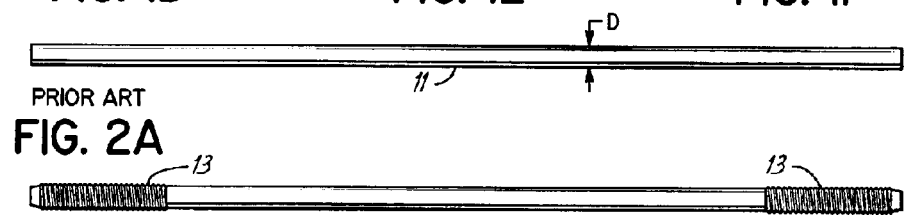
PRIOR ART
FIG. 2A
PRIOR ART
FIG. 2B
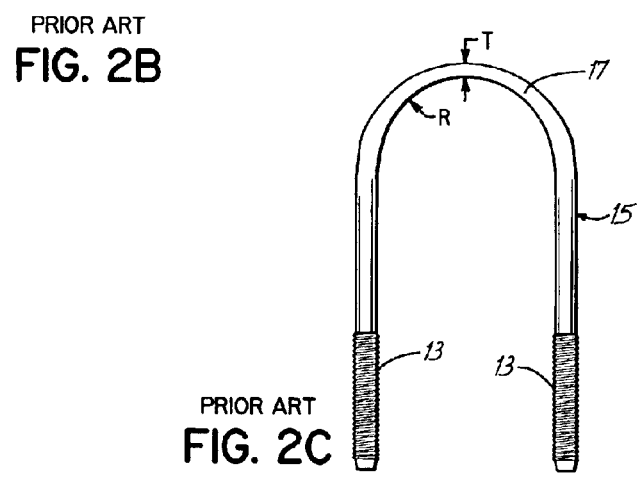
PRIOR ART
FIG. 2C

FLATTENED U-BOLT AND METHOD

This claims the benefit of U.S. Provisional Patent Application No. 60/336,523, filed Oct. 23, 2001 and hereby incorporated by reference in its entirety.

BACKGROUND OF THE INVENTION

This invention relates to a method of making high-strength steel U-Bolts from end-threaded rods that are flattened along their center section. More particularly, it relates to a method in which a flattened end-threaded rod of high strength steel is cold formed into a U-bolt having a desired geometric shape, such that the strength of the U-bolt remains substantially the same or greater than the flattened end-threaded rod.

Many methods exist for the production of high-strength steel parts and other members. In particular, U.S. Pat. Nos. 5,236,520; 5,330,594; 5,496,425; 5,538,566; 5,094,698; 5,704,998; 5,454,888; and 5,453,139 each disclose a method for forming such parts or other members and each is hereby incorporated by reference in its entirety. One such part is a flattened U-bolt.

Many original equipment manufacturers (OEM's) in the automotive and trucking industries currently use flattened U-bolts for a number of reasons. Two of these reasons are to increase the contact area between the axle and the U-bolt, and to increase the clearance between other parts of the suspension assembly and the U-bolt. The increase in the contact area is considered necessary because the OEM's have saved material costs and reduced weight by reducing the thickness of the material used in their axles. With the change to such thinner and lighter weight axles, a non-flattened U-bolt has the potential to collapse the axle. The contact surface area between the non-flattened U-bolt and the axle is limited to the rounded, circumferential portion of the U-bolt thereby concentrating the applied load in a smaller area of the axle and increasing the possibility of deformation or failure of the axle. Therefore, flattened U-bolts are preferred because the flattened portion increases the surface area of contact between the U-bolt and axle, thereby distributing the load and decreasing the likelihood of damaging the axle.

Vehicles using these flattened U-bolts are often modified after they leave the factory. The modification typically requires a replacement U-bolt. Suspensions are frequently modified to meet customer requirements or to increase the load carrying capabilities of the vehicle. In most modifications, one or more springs are added to the existing suspension and a longer U-bolt is required to secure the suspension.

Known sources for supplying replacement U-bolts cannot produce a flattened U-bolt. Typically, a spring and suspension repair facility will have the equipment and material to cold bend a high-strength replacement U-bolt. Such facilities cold bend high-strength, end-threaded rods into U-bolts that will meet the length requirements of the repair or modification.

However, the spring and suspension repair facility does not have access to an inventory of flattened high-strength steel, flattened end-threaded rods. Therefore, when a vehicle that has an OEM flattened U-bolt is modified, and longer U-bolts are required as a result of the modification, the replacement U-bolt is currently made from non-flattened material. The resulting non-flattened, cold bent, U-bolts do not meet the specifications of the OEM design and have the possibility of damaging the axle.

Flattened U-bolts are currently produced by warm forming. In warm forming, a high-strength steel blank or rod is heated to a temperature that is below the recrystallization temperature of the steel and low enough that the strength of the blank or rod is not lowered, but high enough to enhance forming. Referring to FIGS. 2A–2C, the high-strength steel blank or rod 11 has its opposite ends 13 threaded and is flattened and bent into a U-bolt 15 using a one stroke or two stroke operation.

In the current one stroke operation, a flat 17 is initially formed on the rod or blank 11 thereby generating heat and warming the flattened or central portion 17 of the rod or blank 11. Immediately thereafter in the remainder of the machine stroke, the flattened and warmed rod 11 is bent into the U shape. In the current two stroke operation, the end-threaded 13 blank or rod 11 of high-strength steel is flattened with the first stroke and then, on a separate tool or machine, the flattened rod 11 is bent with a second stroke immediately (i.e., within 3–10 seconds) after being flattened in the first stroke.

The flattening portion of both the one and the two stroke operations causes the flattened section 17 of the blank or rod 11 to increase in temperature. This temperature increase in the one or two stroke operation enhances the formability of the flattened section 17 of the rod 11. Typically, the flattening step of the one or the two stroke operation raises the temperature of the rod 11, at least in the flattened section 17, from ambient to about 250° F. Without the temperature increase that occurs during the flattening operation, prior to this invention it was not possible to form U-bolts 15 from flattened rods or blanks 11 because cold bending the flattened end-threaded rod 11 commonly resulted in the rod breaking.

Therefore, a spring and suspension repair facility, while having the equipment to cold bend a high-strength replacement U-bolt, does not have the resources to or advantages of warm forming a rod or blank into a U-bolt. Due to the significant change in geometry of the flattened end-threaded rod relative to the non-flattened end-threaded rod, the flattened rods commonly break, crack or fracture when being cold formed into a U-bolt. Therefore, the spring and suspension repair facility simply cold forms a non-flattened end-threaded rod for use in the modified suspension system in contravention of the OEM's specifications. The industry needs a solution to this problem of the inability to consistently and reliably cold form a flattened end-threaded rod into a flattened U-bolt.

SUMMARY OF THE INVENTION

This invention answers the need for high-strength steel, flattened, end-threaded rods that can be cold bent into high-strength, flattened, U-bolts. These flattened end-threaded rods or blanks are made from high-strength steel and threaded on both ends. The center of the blank is then flattened. This flattened area has a longitudinal dimension that is at least equal to the circumferential portion or arc of the axle on which it is to be installed. The cross section of the flattened area consists of at least one flat, which is the surface, that will contact the axle. Alternatively, opposing top and bottom surfaces are flattened to provide a flat contact surface on the axle and reduced clearance for the U-bolt on the axle thereby offering available space for nearby components.

Applicant has discovered that by controlling the amount of cold work put into the material during bending, it is possible to manufacture a flattened end-threaded rod, from a high-strength steel that can then be cold bent into a U-bolt. By controlling the amount or degree of flattening and the radius of the U-bolt, it is possible to cold bend a high-strength blank after it has been flattened and allowed to cool. Therefore, the spring and suspension repair facility avoids the need to heat the flattened rods for warm forming and, instead, can maintain an inventory of end-threaded and flattened rods for cold forming to flattened U-bolts and comply with the OEM designs when modifying or repairing vehicles.

BRIEF DESCRIPTION OF THE DRAWINGS

The objectives and features of the invention will become more readily apparent from the following detailed description taken in conjunction with the accompanying drawings in which:

FIG. 1A is a plan view of a rod or blank used as the starting material according to one presently preferred embodiment of this invention;

FIG. 1B is a plan view of the rod of FIG. 1A with the spaced ends threaded;

FIG. 1C is a plan view of the rod of FIG. 1B with the central region flattened on opposite faces thereof;

FIG. 1D is a plan view of a flattened U-bolt that has been cold formed from the end-threaded and flattened rod of FIG. 1C;

FIG. 1E is a plan view of an alternative configuration of a flattened U-bolt that has been cold formed from the end-threaded and flattened rod of FIG. 1C;

FIG. 1F is a plan view of another alternative configuration of a flattened U-bolt that has been cold formed from the end-threaded and flattened rod of FIG. 1C;

FIG. 2A is a plan view of a rod or blank used as the starting material according to a prior art method of forming a flattened U-bolt;

FIG. 2B is a plan view of the rod of FIG. 2A with the spaced ends threaded;

FIG. 2C is a plan view of a flattened U-bolt that has been warm formed from the end-threaded rod of FIG. 2B;

DETAILED DESCRIPTION OF THE INVENTION

Figure 3:
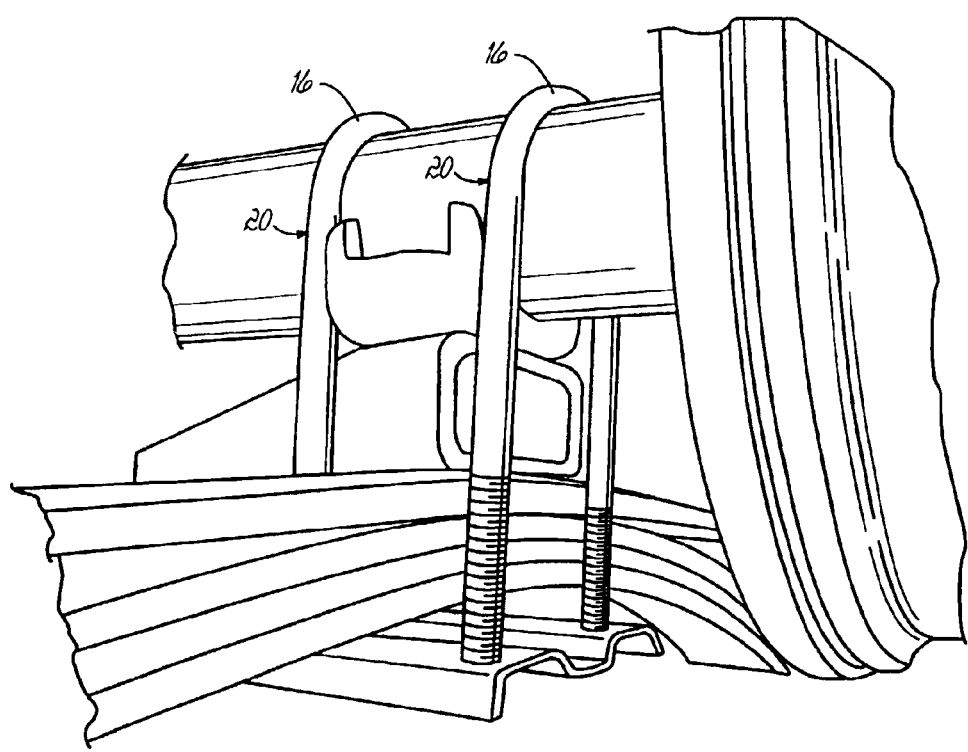
FIG. 3 is a schematic drawing of a flattened U-bolt according to this invention installed on an automotive axle.

A prior art method for forming a flattened U-bolt 15 is shown generally in sequential fashion in FIGS. 2A–2C. Likewise, the prior art methods employ warm forming to bend the end-threaded rod 11 into the U-shaped configuration while concurrently flattening the central portion 17 of the rod 11 in the one or two stroke operation described in the "Background of the Invention" hereinabove. Briefly, the prior art method involves a blank or rod 11 having a generally circular configuration and a diameter D as shown in FIG. 2A. Opposite ends 13 of the rod 11 are then threaded by any method currently known in the art to produce threaded end sections 13 of the rod 11 as shown in FIG. 2B. Subsequently, the end-threaded rod 11 is formed into a flattened U-bolt 15 in a one or two stroke operation as previously described. The initial step in both the one and two stroke operation is to flatten a central portion 17 of the rod 11 between the threaded ends 13 so that it has a thickness t. The flattening step of the prior art method generates heat when the rod 11 is flattened thereby raising the temperature of the high-strength steel as much as 250° F. When the flattened end-threaded rod 11 is immediately formed into the U shape, a portion of the rod 11 that is bent is already heated from the flattening procedure resulting in essentially a warm forming of the U-bolt 15 as shown in FIG. 2C.

Referring to FIGS. 1A–1F, a presently preferred embodiment of this invention is shown and described. Initially, the high-strength steel rod or blank 10 having a generally circular cross-sectional configuration with a diameter D (FIG. 1A) has threads 12 formed on opposite ends to produce threaded end sections 14 (FIG. 1B). However, unlike the prior art methods, the end-threaded high-strength steel rod 10 of FIG. 1B is then flattened along its central section 16 to a thickness t. In one embodiment, the flattened section 16 of the end-threaded rod 10 has opposing faces 18, 18 that are flattened; whereas, in an alternative embodiment, only one face 18 of the rod 10 is flattened to produce the diameter of the rod 10 to the thickness t (see FIG. 3).

Unlike the prior art method, the flattened end-threaded rod 10 is then allowed to cool to ambient temperature prior to bending the flattened end-threaded rod into a U-bolt 20. For example, the flattened, end-threaded rod 10 would be shipped to a spring and suspension repair shop or other facility from the manufacturer. In this scenario, the flattened, end-threaded rod 10 cools from the flattening procedure to ambient temperature.

Therefore, the later bending operation to form the U-bolt 20 is accomplished through a cold forming procedure. The cold forming is generally described as bending the end-threaded flattened rod 10 at a temperature between ambient or room temperature up to less than about 250° F. Previously, attempts at cold forming flattened end-threaded rods 10 into flattened U-bolts 20 have resulted in failure, breakage or cracking during the bending operation. However, according to this invention, controlling the amount of cold work of the high-strength steel rod 10 during bending in relation to the degree of flattening of the rod 10 relative to the radius of the resulting U-bolt 20, cold bending a high-strength steel blank or rod 10 after it has been flattened and allowed to cool is accomplished. As a result, a spring and suspension repair facility or the like avoids the need to heat flattened rods for successful warm forming of U-bolts 20 and instead, can maintain an inventory of end-threaded and flattened rods 10 for cold forming into U-bolts 20 in compliance with OEM designs for modified or repaired vehicles as previously described.

Figure 4:
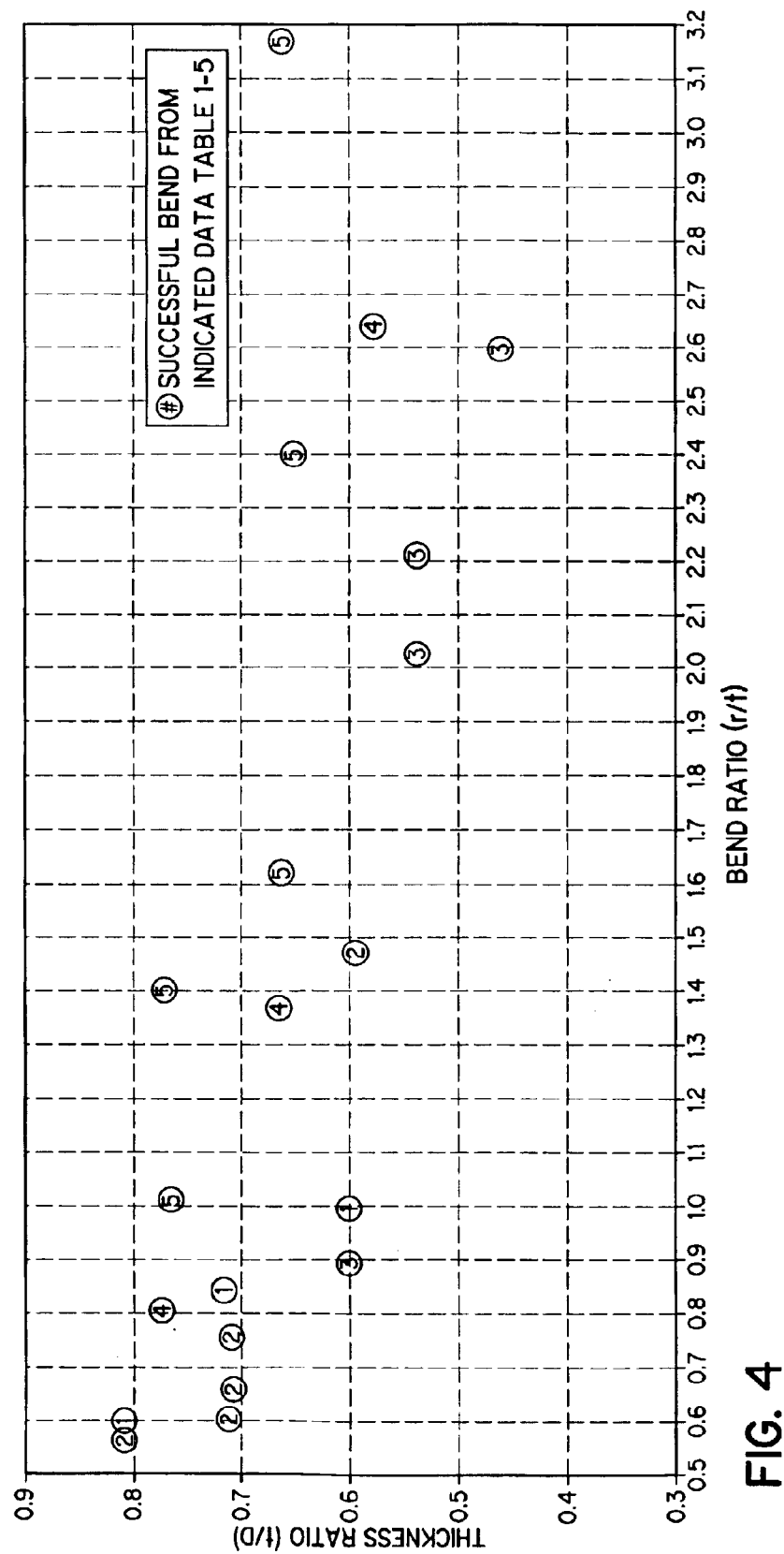
FIG. 4 is a plot of the degree or amount of flattening of the rod as a percentage of the original rod diameter versus a ratio of the radius of the bend in the U-bolt and the thickness of the flattened portion of the U-bolt according to this invention.

Applicant has performed testing and analysis to demonstrate the relationship among the degree of flattening, the original diameter of the rod or blank, and the radius of the bend induced into the flattened end-threaded rod for successful cold forming operations of the flattened U-bolt. Test results accomplished according to this invention are summarized in the following tables 1–5 as well as the plot of FIG. 4. Samples tested according to the results displayed in the tables were all 1552 steel rods each having the indicated diameter D with a circular cross-sectional configuration that were flattened to a thickness t as indicated in the respective tables and cold formed into a square bend U-bolt with radius r similar to the configuration shown in FIG. 1E.

TABLE 1

Rod Diameter, D = 0.522"

| Flat Thickness, | Thickness Ratio, | Bend Radius, r (Bend Ratio, r/t) | | |
|---|---|---|---|---|
| t | t/d | 0.250" | 0.275" | 0.3125" |
| 0.316 | 0.60 | No (0.79) | No (0.87) | Yes (0.99) |
| 0.375 | 0.72 | No (0.67) | No (0.73) | Yes (0.83) |
| 0.422 | 0.81 | Yes (0.59) | N/A | N/A |

Yes = successful bend; No = rod failed during bending; N/A = Not tested

TABLE 2

Rod Diameter, D = 0.584"

| Flat Thickness, | Thickness Ratio, | Bend Radius, r (Bend Ratio, r/t) | | | | |
|---|---|---|---|---|---|---|
| t | t/d | 0.250" | 0.276" | 0.3125" | 0.375" | 0.500" |
| 0.345" | 0.59 | No (0.72) | N/A | No (0.91) | No (1.09) | Yes (1.45) |
| 0.415" | 0.71 | Yes (0.60) | Yes (0.67) | Yes (0.75) | N/A | N/A |
| 0.474" | 0.81 | N/A | Yes (0.58) | N/A | N/A | N/A |

Yes = successful bend; No = rod failed during bending; N/A = Not tested

TABLE 3

Rod Diameter, D = 0.706"

| Flat Thickness, | Thickness Ratio, | Bend Radius, r (Bend Ratio, r/t) | | | | | |
|---|---|---|---|---|---|---|---|
| t | t/d | 0.250 | 0.3125 | 0.375 | 0.500 | 0.750 | 0.8125 |
| 0.316" | 0.45 | No (0.79) | No (0.99) | N/A | N/A | No (2.37) | Yes (2.57) |
| 0.375" | 0.53 | N/A | No (0.83) | No (1.00) | No (1.33) | Yes (2.00) | Yes (2.17) |
| 0.422" | 0.60 | No (0.59) | No (0.74) | Yes (0.89) | N/A | N/A | N/A |

Yes = successful bend; No = rod failed during bending; N/A = Not tested

TABLE 4

Rod Diameter, D = 0.823"

| Flat Thickness, | Thickness Ratio, | Bend Radius, r (Bend Ratio, r/t) | | | | |
|---|---|---|---|---|---|---|
| t | t/d | 0.375" | 0.500" | 0.750" | 1.00" | 1.25" |
| 0.471" | 0.57 | No (0.80) | No (1.06) | No (1.59) | No (2.12) | Yes (2.65) |
| 0.549" | 0.67 | N/A | No (0.91) | Yes (1.37) | N/A | N/A |
| 0.636" | 0.77 | No (0.59) | Yes (0.79) | N/A | N/A | N/A |

Yes = successful bend; No = rod failed during bending; N/A = Not tested

TABLE 5

Rod Diameter, D = 0.949"

| Flat Thickness, | Thickness Ratio, | Bend Radius, r (Bend Ratio, r/t) | | | | | | | |
|---|---|---|---|---|---|---|---|---|---|
| t | t/d | 0.6875" | 0.750" | 0.9375" | 1.00" | 1.50" | 1.75" | 2.00" | 2.25" |
| 0.536" | 0.56 | N/A | N/A | No (1.75) | N/A | N/A | N/A | N/A | No (4.20) |
| 0.626" | 0.66 | N/A | No (1.20) | No (1.50) | Yes (1.60) | Yes (2.40) | Yes (2.80) | Yes (3.19) | Yes (3.59) |
| 0.723" | 0.76 | No (0.95) | Yes (1.04) | N/A | Yes (1.38) | N/A | N/A | N/A | Yes (3.11) |

Yes = successful bend; No = rod failed during bending; N/A = Not tested

The resulting U-bolt according to embodiments of this invention may have a fully round bend with a radius r (FIG. 1D), a square bend with each corner of the U-bolt having a radius r (FIG. 1E), or a semi-round bend with each elbow of the U-bolt having a radius r (FIG. 1F). In a preferred embodiment, the method of the present invention for making a high-strength steel flattened U-bolt includes providing a blank or rod of high-strength steel material having a microstructure of fine pearlite in a ferritic matrix, a tensile strength of at least about 120,000 psi and preferably at least about 150,000 psi, and a yield strength of at least about 90,000 psi, and preferably at least about 130,000 psi. Pearlitic constituents are generally considered to be "fine" when their lamellae are not resolvable at an optical magnification of about 1000 times. In one form, the high-strength steel material utilized as the blank has been hot reduced and cold drawn to provide the blank or rod having the mechanical properties of tensile strength and yield strength stated above.

The high-strength steel material used to make the blank or rod has the following composition, by weight percent:

carbon about 0.30 to about 0.65% manganese about 0.30 to about 2.5% aluminum, niobium, titanium and/or vanadium, and mixtures thereof, in an effective amount up to about 0.35%; and iron balance.

In a more preferred form, the high-strength steel material has the following composition, by weight percent:

carbon about 0.40 to about 0.55% manganese about 0.30 to about 2.5% aluminum, niobium, titanium and/or vanadium and mixtures thereof, in an effective amount up to about 0.20%; and iron balance.

In a still more preferred form, the high-strength steel material has the following composition, by weight percent:

carbon about 0.50 to about 0.55% manganese about 1.20 to about 1.65% aluminum, niobium, titanium and/or vanadium, and mixtures thereof, in an effective amount from about 0.03 to about 0.20%; and iron balance.

While aluminum, niobium (i.e., columbium), titanium and vanadium typically act as grain refiners to produce a fine grained steel, in this invention these elements are not included for that purpose, but to assist in maintaining the strength of the U-bolt by forming nitrites in the high-strength steel. Furthermore, it should be understood that the compositions listed and claimed herein may include other elements which do not impact upon the practice of this invention.

The blank or rod, having a composition and mechanical properties of tensile strength and yield strength as given above is then threaded on the opposite ends thereof as is well known in this art. Thereafter, the end-threaded rod is preferably cold formed using such techniques as stamping, pressing or the like at a temperature between ambient or room temperature up to less than about 250° F., and preferably at about ambient temperature, to provide a rod having a desired geometric configuration that includes at least one and alternatively two flat surfaces, whereby the mechanical properties of tensile strength and yield strength of the flattened rod are substantially the same or greater than the blank. Alternatively, the flat surfaces may be formed not by cold forming but by any other known method for flattening the rod. Subsequently, the flattened and end-threaded rod is allowed to cool from the flattening procedure.

Thereafter, the flattened and end-threaded rod is cold formed into a U-bolt by a spring and suspension repair facility or the like as is well known in the art. One method of cold bending a U-bolt is disclosed in U.S. patent application Ser. No. 09/658,810, filed Sep. 11, 2000 and hereby incorporated by reference in its entirety. The formed U-bolt, with the mechanical properties of tensile strength and yield strength given, is preferably produced without the need for further processing steps, such as a final stress relieving step, to improve toughness. However, for certain geometric configurations and applications, a stress relieving step may be necessary.

The blank of high-strength steel material having a tensile strength of at least about 120,000 psi and a yield strength of at least 90,000, which is used as the starting piece in the method of the present invention, is produced by any suitable method known in the art. One such method is disclosed in U.S. Pat. No. 3,904,445 to the present assignee and the specification in its entirety is incorporated herein by reference. The '445 patent discloses a processing sequence to produce a high-strength steel bar stock of the type particularly useful for producing threaded fasteners. In the described process, the bar stock produced has a fine grained structure between about ASTM No. 5–8. In the disclosed process, a steel, having a composition falling within certain disclosed ranges, is subjected to a standard hot reducing operation to within 10%–15% of final gauge. The hot reduced bar stock is then cut or severed into individual lengths for rapid air cooling. Thereafter, the individual lengths of hot reduced bar stock are subjected to a cold finishing to final gauge. The final step is a controlled stress relieving step to increase the mechanical strength properties. This stress relieving step comprises heating the lengths of bar stock to between about 500° F.–850° F. for about one hour, but may or may not be necessary. Thus, such bar stock, with and without further stress relieving may be used to form the starting high-strength steel blank or rod.

From the above disclosure of the general principles of the present invention and the preceding detailed description of at least one preferred embodiment, those skilled in the art will readily comprehend the various modifications to which this invention is susceptible. Therefore, I desire to be limited only by the scope of the following claims and equivalents thereof.

I claim:

1. A method for making a flattened U-bolt comprising the steps of:

providing a rod of high-strength steel material having a diameter, spaced ends, a ferrite-pearlite microstructure and a tensile strength of at least about 120,000 psi and a yield strength of at least about 90,000 psi that comprises by weight:
carbon about 0.30 to about 0.65%
manganese about 0.30 to about 2.5%
aluminum, niobium, titanium and/or vanadium, and mixtures thereof, in an effective amount up to about 0.35% iron balance;

threading each of the spaced ends;

flattening a portion of the rod intermediate the spaced ends to a thickness; and cold forming the flattened rod into a U-bolt having a radius, whereby the mechanical properties of tensile strength and yield strength of said U-bolt are substantially the same or greater than said rod;

wherein the cold forming is a function of the diameter of the rod, the thickness of the flattened portion and the radius to avoid fracture and cracking of the rod during the cold forming.

2. The method of claim 1 wherein said U-bolt with said mechanical properties are produced without the need for further processing steps to improve toughness.

3. The method of claim 1 wherein the high-strength steel material has previously been hot reduced and cold drawn to provide said rod.

4. The method of claim 1 wherein the rod of high-strength steel material has a tensile strength of at least about 150,000 psi and a yield strength of at least about 130,000 psi.

5. The method of claim 1 wherein the high-strength steel material comprises, by weight percent:
carbon about 0.40 to about 0.55%
manganese about 0.30 to about 2.5%
aluminum, niobium, titanium and/or vanadium and mixtures thereof, in an effective amount up to about 0.20%
iron balance.

6. The method of claim 1 wherein the high-strength steel material comprises, by weight percent:
carbon about 0.50 to about 0.55%
manganese about 1.20 to about 1.65%
aluminum, niobium, titanium and/or vanadium, and mixtures thereof, in an amount from about 0.03 to about 0.20%
iron balance.

7. The method of claim 1 wherein said cold forming is carried out at ambient temperature up to less than about 250° F.

8. The method of claim 1 wherein said U-bolt with said mechanical properties is subjected to stress relieving within a temperature range between about 450° F. to about 1,2000 F. in order to modify the physical characteristics of said U-bolt.

9. The method of claim 1 wherein the cold forming further comprises forming the rod into a full round U-bolt, a square round U-bolt or a semi-round U-bolt.

10. The method of claim 1 wherein the flattening further comprises flattening one face of the intermediate portion of the rod.

11. The method of claim 1 wherein the flattening further comprises flattening two spaced faces of the intermediate portion of the rod.

12. The method of claim 1 wherein the cold forming is a function of the ratio of the radius to the thickness and/or the thickness to the diameter.

* * * * *